Aug. 15, 1961 R. H. RILEY, JR., ET AL 2,995,960
TWO-SPEED FEEDING AND RETRACTING MEANS
FOR A PORTABLE DRILL STAND
Filed July 11, 1960 3 Sheets-Sheet 1
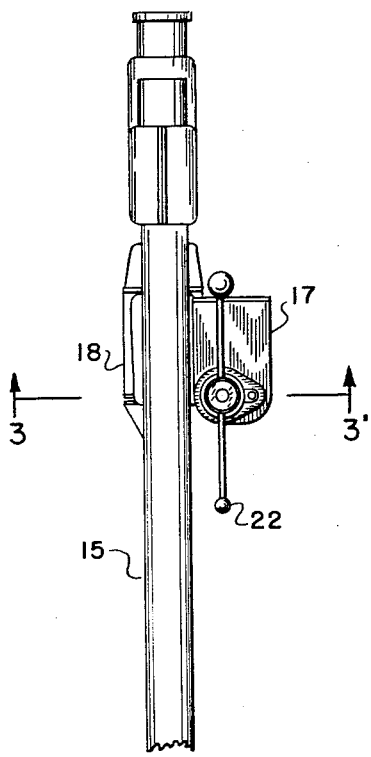
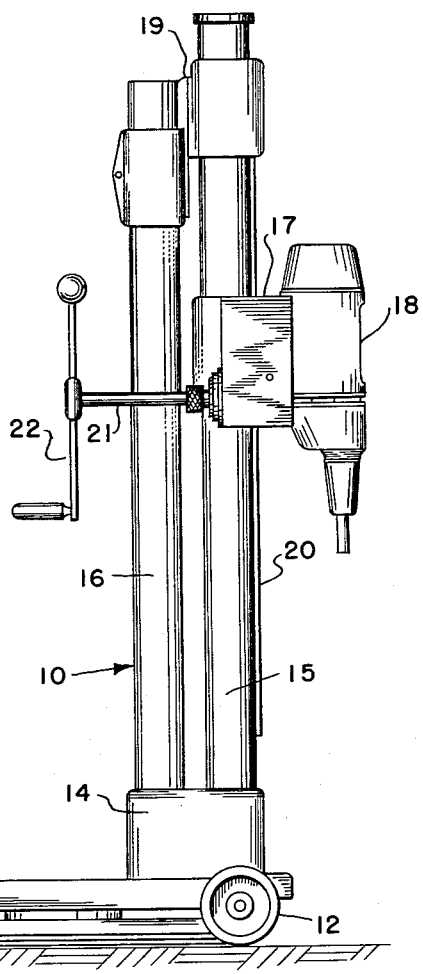
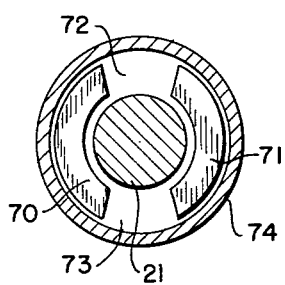
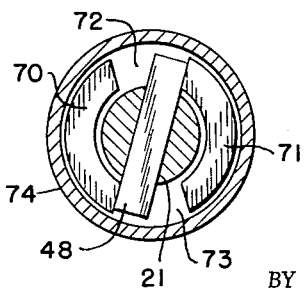
INVENTORS
ROBERT H. RILEY, JR.
HAROLD O. SHORT
BY
*Leonard Bloom*
ATTORNEY Aug. 15, 1961    R. H. RILEY, JR., ET AL    2,995,960
TWO-SPEED FEEDING AND RETRACTING MEANS
FOR A PORTABLE DRILL STAND
Filed July 11, 1960            3 Sheets-Sheet 2
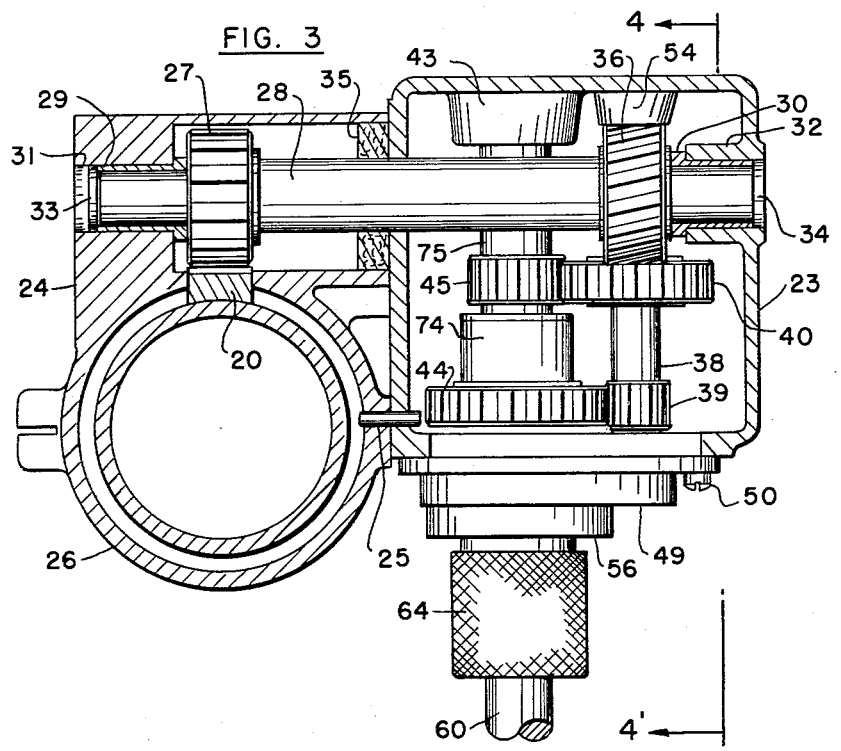
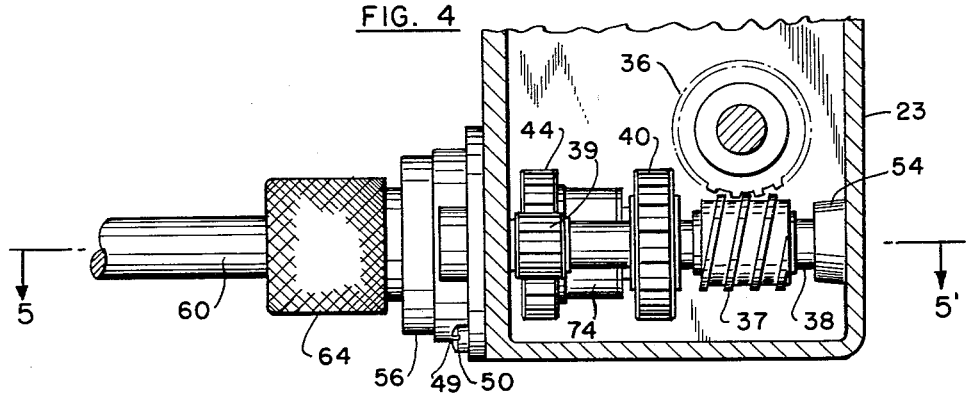
INVENTORS
ROBERT H. RILEY, JR.
HAROLD O. SHORT
BY    *Leonard Bloom*
                 ATTORNEY Aug. 15, 1961

R. H. RILEY, JR., ET AL 2,995,960

TWO-SPEED FEEDING AND RETRACTING MEANS
FOR A PORTABLE DRILL STAND

Filed July 11, 1960

INVENTORS
ROBERT H. RILEY, JR.
HAROLD O. SHORT

BY

*Leonard Bloom*
ATTORNEY

United States Patent Office 2,995,960
Patented Aug. 15, 1961

2,995,960
TWO-SPEED FEEDING AND RETRACTING MEANS FOR A PORTABLE DRILL STAND
Robert H. Riley, Jr., and Harold O. Short, Towson, Md., assignors to The Black and Decker Manufacturing Company, Towson, Md., a corporation of Maryland
Filed July 11, 1960, Ser. No. 41,917
6 Claims. (Cl. 77—32)

The present invention relates to a shiftable two-speed feeding and retracting means for a power-operated tool, and more particularly, to such means which is associated with a drill stand having a supporting column and further having a drill carriage including a power-operated drill positioned upon said column.

It is an object of the present invention to provide such a shiftable two-speed feeding and retracting means that may be manipulated conveniently and quickly by the operator.

It is another object of the present invention to provide such a shiftable two-speed feeding and retracting means that may be mass produced quickly and economically.

It is yet another object of the present invention to provide (in conjunction with a shiftable two-speed feeding and retracting means) a lockout means to preclude the occurrence of an inadvertent shifting during the operation of the drill.

These and other objects of the present invention will become apparent from an inspection of the foregoing specification taken in conjunction with the accompanying drawings, in which:

FIGURE 1 is a side elevational view of the type of drill stand in which the present invention finds particular utility;

FIGURE 2 is a partial rear elevational view of the supporting column and drill carriage for the drill stand shown in FIGURE 1;

FIGURE 3 is a sectional view taken along the lines 3—3' of FIGURE 2, showing the interconnection between the driving spindle and the drill carriage as mounted upon the supporting column, and further showing in pictorial fashion a pair of gears mounted (rotatably) upon the driving spindle;

FIGURE 4 is a sectional view taken along the lines 4—4' of FIGURE 3, showing the countershaft provided with a worm gear drive;

FIGURE 7 is a view taken along the lines 7—7' of FIGURE 5, showing a driven clutch surface formed on the inner face of one of the gears; and FIGURE 8 is a view taken along the lines 8—8' of FIGURE 6, showing the driving clutch pin press-fitted within the driving spindle and engaging the driven clutch surface.

Figure 5:
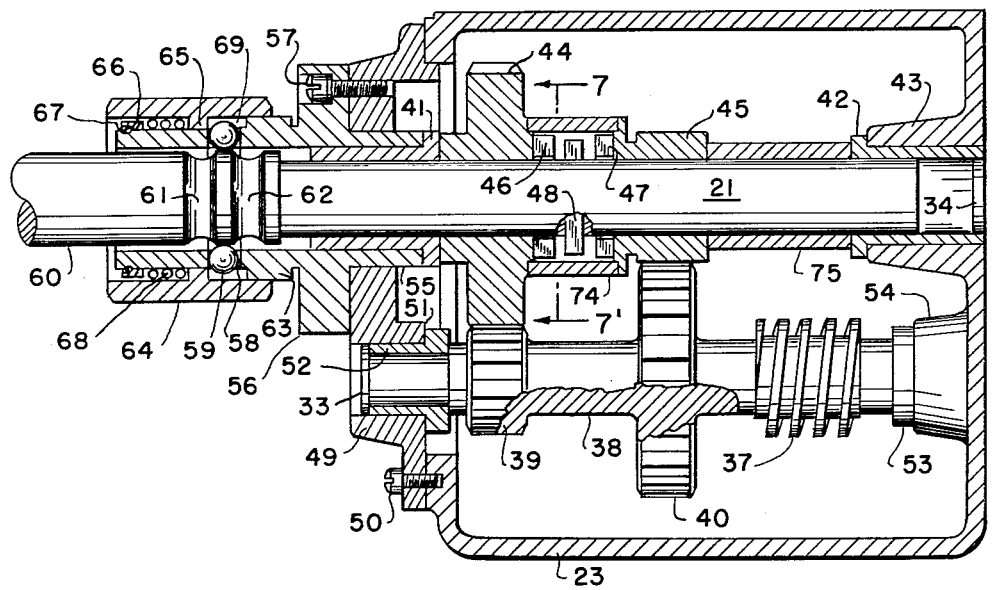
FIGURE 5 is a sectional view taken along the lines 5—5' of Figure 4, showing the shifting mechanism in the neutral position.

In accordance with the teachings of a preferred embodiment of the present invention, there is provided in cooperation with a drill stand having a supporting column and further having a drill carriage including a power-operated drill positioned upon the supporting column, a shiftable two-speed feeding and retracting means which enables the drill carriage to moved with respect to the supporting column in either direction and at either of two preselected speeds, as desired by the operator. This shiftable two-speed feeding and retracting means includes a driving spindle journalled for rotation within a suitable housing and adapted to have a limited axial movement therein. The driving spindle includes an extension portion outwardly of the housing, and means (usually manual, but not necessarily so) are further provided to rotate the driving spindle in either direction. A pair of gears of different size are rotatably mounted upon the driving spindle (within the housing), and each of these gears has an inner face which is provided with a suitable driven clutch surface formed thereon. A driving clutch member (preferably a pin, but not necessarily so) is rigidly connected to the driving spindle intermediate the pair of gears for engagement with either of the driven clutch surfaces when the driving spindle is axially shifted by a limited amount in either direction with respect to said housing, thus coupling either of the pair of gears to the driving spindle. Locking means are provided to hold the driving spindle steadily in a pre-selected adjusted position, and manually-manipulated means are further provided to release the locking means and allow the driving spindle to be axially shifted by a limited amount and in either direction with respect to the housing. In such a manner, the driving clutch member engages either of the driven clutch surfaces for operatively connecting either of the gears with the driving spindle; and suitable gear train means are provided to operatively engage each of the gears for ultimately connecting the driving spindle with the drill carriage, whereby the drill carriage then may be moved with respect to the supporting column in either of two speeds and in either direction.

With reference to FIGURE 1, there is illustrated the type of transportable drill stand 10 in connection with which the teachings of the present invention may find particular utility. Apparatus of this general nature may be used for a variety of drilling operations, including of course, the drilling of large cores out of concrete or like materials; and the drill stand 10 may include a base 11 having suitable wheels 12 and further having, if desired, a vacuum hold-down plate indicated generally at 13. A suitable housing 14 supports a pair of columns, one of which is a supporting column 15, and the other of which is an auxiliary column 16. Supporting column 15 carries a drill carriage, indicated generally at 17, which includes a suitable power-operated drill 18, the latter being provided with a suitable bit (not shown) for performing the drilling operation. Conventional means, a portion of which is indicated generally at 19, may be provided to enable the supporting column 15 to be raised from the housing 14 and pivoted about an axis which is transverse with respect to the longitudinal axis of auxiliary column 16, thus enabling the drill 18 to assume a variety of positions in addition to the vertical position specifically illustrated in FIGURE 1. With reference to FIGURES 1 and 2, the drill carriage 17 may be moved in either direction along the supporting column 15 by means of a suitable rack 20 (secured to or otherwise suitably formed along supporting column 15) in conjunction with transmission means (hereinafter to be described in detail) housed within the drill carriage 17 and adapted to be actuated by means of a driving spindle 21. A suitable hand-operated crank 22 is provided for rotating the driving spindle 21, although it is to be understood that the essence of the present invention is not necessarily to be confined to hand-actuated feeding or retracting means, but on the contrary contemplates a completely power-actuated system.

Moreover, the teachings of the present invention contemplate the conjunctive use of some suitable transmission (or gear train) means for feeding or retracting the drill 18 into the work, and such means will now be described in detail with particular reference to FIGURES 3 and 4, in which there is illustrated a housing 23 (in the nature of a gear box); and a second housing 24 is keyed to housing 23 by means of suitable locating pins, one of which is indicated at 25. Suitable means (not shown) are provided for securing housings 23 and 24 together. The second housing 24 is adapted to slidably fit over the supporting column 15; and a driving connection is provided for rack 20 (on supporting column 15) by means of a pinion 27 carried by transverse shaft 28, which is journalled within sleeve bearings 29 and 30 seated in respective bosses 31 and 32 of housings 24 and 23, respectively. Also, suitable bearing plugs 33 and 34 are provided for bearings 29 and 30, respectively, and suitable gasket means (indicated generally at 35) is provided between the housings 23 and 24. Transverse shaft 28 carries a worm wheel 36, which meshes with a worm 37 (see FIGURE 4) carried by counter-shaft 38, which also carries gears 39 and 40.

In the practical use of apparatus of this nature, such as drill stand 10, it is very convenient to have a shiftable two-speed feeding and retraction means, that is to say, it is often desirable to be able to feed the drill 18 into the work at either a "high" rate or a "slow" rate and to be able to shift from one or other conveniently and easily. Moreover, once the drill 18 has advanced into the work and completed its drilling operation, say at a slow rate, it is then desirable to be able to retract the drill 18 out of the work at a more rapid rate, thus conserving the time and energy of the operator. For this purpose, the present invention provides a shiftable two-speed feeding and retraction means, the construction and operation of which will now be explained in detail.

With reference to FIGURES 3 through 6, driving spindle 21 is journalled within housing 23 by means of sleeve bearings 41 and 42, the latter being fitted within a suitable boss 43 formed within housing 23; and driving spindle 21 is adapted to have a limited axial movement in either direction with respect to housing 23. Moreover, driving spindle 21 has a pair of gears 44 and 45 rotatably mounted thereon (see FIGURES 5 and 6) and adapted to mesh (respectively) with gears 39 and 40 carried by counter-shaft 38. Each of the gears 44 and 45 has an inner face which is provided with a suitable driven clutch surface 46 and 47, respectively; and a driving clutch member (such as pin 48 having a square cross-section) is rigidly connected (as by a press-fit) to driving spindle 21 intermediate gears 44 and 45 (see FIGURES 5 and 6) for ultimate engagement, as desired, with either of the driven clutch surfaces 46 and 47 whenever driving spindle 21 is axially shifted by a limited amount and in a direction which is either into or out of housing 23. In such a manner, driving spindle 21 will be operatively connected to either of the gears 44 and 45, and hence, driving spindle 21 will ultimately be operatively connected to rack 20 by means of two distinct gear trains. Moreover, it will be appreciated that since gears 44 and 45 are of different size, that the drill carriage 17 will be moved (at two distinct speeds) with respect to the supporting column 15 upon an engagement of the desired clutch elements (either 46 with 48, or 47 with 48) and further, upon a rotation of the driving spindle 21 in the desired direction.

The locking means to hold the driving spindle 21 steady in a pre-selected adjusted position, as well as the manually-manipulated means to release the locking means and allow the driving spindle 21 to be axially shifted, will now be described in detail with particular reference to FIGURES 5 and 6. A suitable cover 49 is secured to housing 23 by means of a plurality of screws, one of which is illustrated at 50; and cover 45 is provided with a boss 51 within which is seated a sleeve bearing 52, which in cooperation with a similar sleeve bearing 53 seated within a boss 54, journals countershaft 38 within housing 23. Cover 49 is further provided with a bore 55 within which is seated a bearing support sleeve 56 secured to cover 49 by means of a plurality of screws, as at 57. Bearing support sleeve 56 is provided with a series of pockets 58 for receiving balls 59 therein, the balls 59 having respective centers which lie in a common plane transverse to driving spindle 21. Moreover, driving spindle 21 includes an extension portion 60 outwardly of housing 23, and extension portion 60 is provided with a pair of parallel external annular grooves 61 and 62, either of which receive balls 59 when driving spindle 21 is axially shifted into its adjusted position. Bearing support sleeve 56 is further provided with an external annular ridge 63 upon which a shifting collar 64 is slidably mounted. An internal annular ridge 65 is formed within shifting collar 64 anteriorly of the external annular ridge 63. Bearing support sleeve 56 is also provided with a spring retaining collar 66 and a retaining ring 67, and suitable resilient means (such as a coiled spring 68) is seated between retaining collar 66 and internal annular ridge 65 to constantly urge the shifting collar 64 against the housing 23. It will be appreciated that internal annular ridge 65 normally retains balls 59 within pockets 58, and that the external annular ridge 63 and the internal annular ridge 65 define therebetween an internal annular recess 69 having a variable height.

*Operation*

Figure 6:
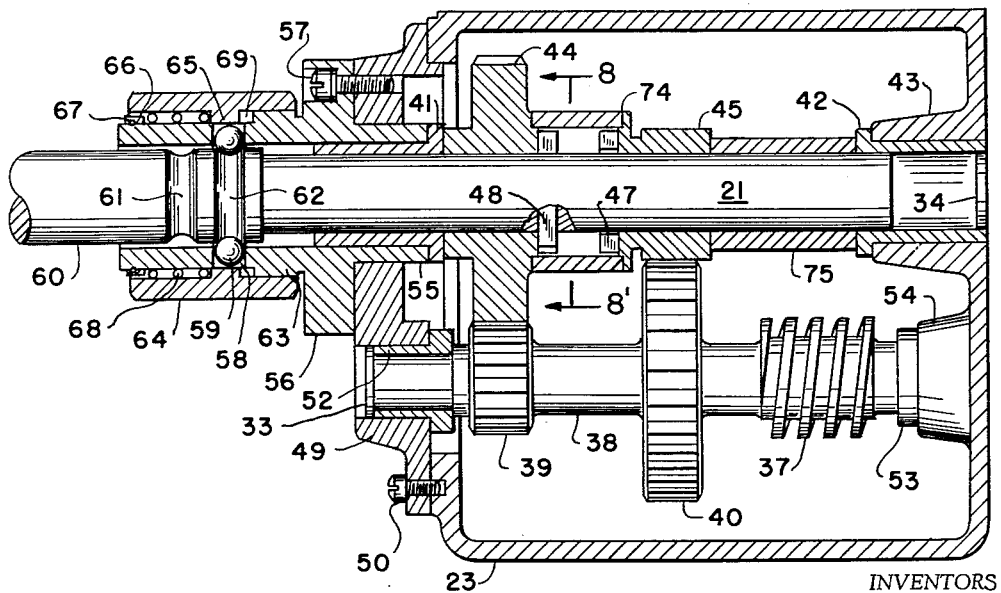
FIGURE 6 is a sectional view similar in nature to FIGURE 5, but showing the mechanism shifted into the higher speed position.

It will be further appreciated from an examination of FIGURES 5 and 6 that in order to shift driving spindle 21 axially in either direction, it is first necessary to manually slide shifting collar 64 against the tension of spring 68 and away from housing 23, that is to say, from the position shown in FIGURE 6 to the position shown in FIGURE 5, such that the internal annular ridge 65 on shifting collar 64 will uncover pockets 58 formed in bearing support sleeve 56; and hence, as driving spindle 21 is axially shifted in either direction, balls 59 will ride out of either of the external annular grooves 61 or 62 and will move (as shown in the neutral position of FIGURE 5) into the internal annular recess 69. Thus, when driving spindle 21 is fully shifted such that either of the external annular grooves 61 or 62 is aligned with pockets 58, shifting collar 64 then may be released, that is to say, the tension of spring 68 will be released to allow shifting collar 64 to be moved towards housing 23; and therefore, internal annular ridge 65 will cover pockets 58 sufficiently (as shown in FIGURE 6) to retain balls 59 in either of the external annular grooves 61 or 62, thus providing a locking means to preclude an inadvertent shifting of the driving spindle 21 during the operation of the tool.

As previously stated, when driving spindle 21 is axially shifted in either direction with respect to housing 23, driving clutch pin 48 will engage either of the driven clutch surfaces 46 or 47 on gears 44 or 45, respectively, thus coupling either of the gears 44 or 45 to the driving spindle 21. Hence, the "fast" drive may be traced from driving spindle 21 to gear 44, gear 39, countershaft 38, worm 37, worm wheel 36, transverse shaft 28, pinion 27, and ultimately, rack 20; while the "slow" drive may be traced from driving spindle 21 to gear 45, and then to gear 40, countershaft 38, etc., to rack 20.

With reference to FIGURES 6 and 7, there is illustrated a preferred embodiment of cooperating clutch elements in which each of the driven clutch surfaces 46 or 47 comprise a pair of arcuate ridges 70 and 71, which are opposite from each other and are disposed adjacent to the outer periphery of the respective gear 44 or 45. The arcuate ridges 70 and 71 have respective opposite cut-out portions 72 and 73 formed between their adjacent extremities; and it will be appreciated from an examination of FIGURE 8, that the projecting portions of the driving clutch pin 48 will be received within the cut-out portions 72 and 73 for mechanically coupling either of the gears 44 or 45 with respect to the driving spindle 21, as the latter is driven by a manual rotation of the crank 22. Also, as shown more particularly in FIGURES 5 and 6, gears 44 and 45 are axially retained on driving spindle 21 by means of suitable spacer sleeves 74 and 75.

Obviously, many modifications may be made without departing from the basic spirit of the present invention; and therefore, within the scope of the appended claims,

We claim:

1. In a drill stand having a supporting column and further having a drill carriage including a power-operated drill positioned upon said column, shiftable two-speed feeding and retracting means to move said drill carriage in either direction with respect to said column, comprising, a housing, a driving spindle journalled for rotation in said housing and having a limited axial movement therein, said driving spindle including an extension portion thereof outwardly of said housing, means to rotate said driving spindle in either direction, a pair of gears of different size rotatably mounted upon said driving spindle within said housing, means to axially retain said gears on said driving spindle, each of said pair of gears having an inner face provided with a driven clutch surface formed thereon, a driving clutch member connected to said driving spindle intermediate said pair of gears for engagement with either of said driven clutch surfaces when said driving spindle is axially shifted by a limited amount in either direction with respect to said housing, gear train means operatively engaged with each of said pair of gears for connecting said driving spindle to said drill carriage, locking means to lock said driving spindle in a pre-selected axially-adjusted position, and manually-manipulated means to release said locking means to allow said driving spindle to be axially shifted by a limited amount and in either direction with respect to said housing, whereby said driving clutch member engages either of said driven clutch surfaces for operatively connecting either of said gears with said driving spindle, and whereby said drill carriage then may be moved with respect to said column in either of two speeds and in either direction.

2. Shiftable two-speed feeding and retracting means as defined in claim 1, wherein said driving clutch member comprises, a transverse opening formed in said driving spindle intermediate said gears, and a driving clutch pin having a square cross-section press-fitted within said transverse opening, said pin having projecting opposite end portions adapted to engage either of said driven clutch surfaces.

3. Shiftable two-speed feeding and retracting means as defined in claim 2, wherein each of said driven clutch surfaces comprises, a pair of arcuate ridges opposite from each other and disposed adjacent to the outer periphery of said respective gear, there being opposite cut-out portions formed between the respective adjacent extremities of said pair of arcuate ridges, whereby said projecting opposite end portions of said driving clutch pin are adapted to be received within said opposite cut-out portions for mechanically coupling either of said pair of gears to said driving spindle.

4. Shiftable two-speed feeding and retracting means as defined in claim 1, wherein said locking means comprises, a bearing support sleeve secured to said housing and encompassing a portion of said extension portion of said driving spindle, a series of ball pockets formed within said bearing support sleeve, each of said series of ball pockets having a center which lies in a common plane transverse to said driving spindle, balls loosely retained in said series of pockets, a pair of parallel external annular grooves formed on said extension portion of said driving spindle, and means to retain said balls in either of said pair of external annular grooves to lock said driving spindle in a pre-selected axially-adjusted position.

5. Shiftable two-speed feeding and retracting means as defined in claim 1, wherein said manually-manipulated means to release said locking means includes a shifting collar encompassing said locking means and being provided with internal means operatively engaging and retaining said locking means in a pre-selected axially-adjusted position of said driving spindle, and resilient means tending to maintain said shifting collar towards said housing, whereby said shifting collar may be manually shifted against the tension of said resilient means and away from said housing to release said locking means.

6. In a drill stand having a supporting column and further having a drill carriage including a power-operated drill positioned upon said column, shiftable two-speed feeding and retracting means to move said drill carriage in either direction with respect to said column, comprising, a housing, a driving spindle journalled for rotation in said housing and having a limited axial movement therein, said driving spindle including an extension portion thereof outwardly of said housing, manually-actuated crank means connected to said extension portion for manually rotating said driving spindle in either direction, a pair of gears of different size rotatably mounted upon said driving spindle within said housing, means to axially retain said gears on said driving spindle, each of said pair of gears having an inner face provided with a driven clutch surface consisting of a pair of arcuate ridges opposite from each other and disposed adjacent to the outer periphery of said respective gear and having opposite cut-out portions formed between the respective adjacent extremities of said ridges, a driving clutch pin press-fitted into a transverse opening in said driving spindle intermediate said pair of gears, said driving clutch pin having a square cross-section and further having projecting opposite end portions adapted to be received within said opposite cut-out portions when said driving spindle is axially shifted by a limited amount with respect to said housing for mechanically coupling either of said pair of gears to said driving spindle, gear train means operatively engaged with each of said pair of gears for connecting said driving spindle to said drill carriage, said gear train means including a worm and a worm wheel, a bearing support sleeve secured to said housing and encompassing a portion of said external portion of said driving spindle, a series of ball pockets formed within said bearing support sleeve, each of said series of ball pockets having a center which lies in a common plane transverse to said driving spindle, balls loosely retained in said series of pockets, a pair of parallel external annular grooves formed on said extension portion of said driving spindle, an external annular ridge formed on said bearing support sleeve intermediate said series of ball pockets and said housing, a shifting collar slidably mounted upon said external annular ridge, resilient means tending to maintain said shifting collar towards said housing, an internal annular ridge formed within said shifting collar anteriorly of said external annular ridge of said bearing support sleeve and defining therebetween an internal annular recess of variable height, said internal annular ridge normally covering said series of ball pockets sufficiently for retaining said balls in either of said pair of external annular grooves in a pre-selected axially-adjusted position of said driving spindle, whereby when said shifting collar is manually shifted away from said housing against the tension of said resilient means, said internal annular ridge uncovers said series of ball pockets and allows said balls to drop within said internal annular recess as said driving spindle is manually shifted axially in either direction with respect to said housing for changing the speed of said feeding and retracting means, and whereby when said shifting collar is then released, the tension of said resilient means moves said shifting collar axially towards said housing to allow said internal annular ridge to retain said balls within either of said external annular grooves to lock said driving spindle against an inadvertent axial shift during the operation of said drill stand.

No references cited.